(12) United States Patent
Hurwitz

(10) Patent No.: US 7,337,784 B2
(45) Date of Patent: *Mar. 4, 2008

(54) HAIRBRUSH FOR PETS AND PEOPLE THAT RELEASES ACTIVE INGREDIENTS

(75) Inventor: Marni Markell Hurwitz, Far Hills, NJ (US)

(73) Assignee: I Did It, Inc., Far Hills, NJ (US)

( * ) Notice: Subject to any disclaimer, the term of this patent is extended or adjusted under 35 U.S.C. 154(b) by 84 days.

This patent is subject to a terminal disclaimer.

(21) Appl. No.: 11/186,583

(22) Filed: Jul. 21, 2005

(65) Prior Publication Data

US 2007/0017538 A1      Jan. 25, 2007

(51) Int. Cl.
*A45D 24/22* (2006.01)
*A46B 29/17* (2006.01)
*A46B 11/04* (2006.01)

(52) U.S. Cl. .......................... 132/116; 15/186; 401/287

(58) Field of Classification Search ............... 132/126, 132/111–116, 120, 159; 401/286–288, 184, 401/282, 28; 15/186, 194
See application file for complete search history.

(56) References Cited

U.S. PATENT DOCUMENTS

| | | | | |
|---|---|---|---|---|
| 1,501,089 A | * | 7/1924 | Andrews | 401/28 |
| 1,607,674 A | * | 11/1926 | Ives | 132/114 |
| 2,952,027 A | * | 9/1960 | Caldwell | 401/28 |
| 3,556,667 A | * | 1/1971 | Kaufman | 401/28 |
| 4,244,076 A | | 1/1981 | Meyer | 15/188 |
| 4,479,501 A | * | 10/1984 | Chern | 132/313 |
| 4,902,154 A | * | 2/1990 | Valenza | 401/132 |
| 5,150,491 A | | 9/1992 | Ikemoto | 15/1.52 |
| 5,261,426 A | | 11/1993 | Kellett et al. | 132/108 |
| 5,443,321 A | * | 8/1995 | Dolan et al. | 401/28 |
| 5,626,099 A | | 5/1997 | Staller et al. | 119/625 |
| 5,762,433 A | * | 6/1998 | Cary | 401/184 |
| 6,006,395 A | * | 12/1999 | Tiramani et al. | 15/176.1 |
| 6,158,442 A | * | 12/2000 | Piatetsky | 132/115 |
| 6,450,127 B2 | | 9/2002 | Willinger et al. | 119/633 |
| 6,543,388 B2 | | 4/2003 | Willinger et al. | 119/633 |
| 6,575,174 B2 | | 6/2003 | Lee | 132/160 |
| 6,618,893 B1 | * | 9/2003 | Wang | 15/186 |
| 6,793,434 B1 | * | 9/2004 | Olson | 401/286 |

* cited by examiner

*Primary Examiner*—Robyn Doan
(74) *Attorney, Agent, or Firm*—Ernest D. Buff & Associates, LLC; Ernest D. Buff; Margaret A. La croix

(57) ABSTRACT

A hairbrush for people and pets releases a perfume, fragrance and/or other active compositions including insect repellant, hair conditioning composition, dye composition, moisturizing ingredients, or antibacterial compounds when brushed or activated by manually depressing a cover. The brush includes a flexible deformable membrane that carries brush bristles and has a plurality of apertures for delivery of the active composition and is fitted within a first opening of an internal cavity in a brush base. A porous sponge being saturated with the active ingredient is inserted over the flexible deformable membrane. A cover is inserted through a second opening and rests upon the porous sponge. Brushing action deforms the flexible deformable membrane and squeezes the sponge releasing the active ingredient. Manually depressing the cover also releases the active ingredient even though the bristles may not be in direct contact with the hair at that time.

8 Claims, 2 Drawing Sheets

HAIRBRUSH FOR PETS AND PEOPLE THAT RELEASES ACTIVE INGREDIENTS

BACKGROUND OF THE INVENTION

1. Field of the Invention

The present invention relates to a hairbrush for pets and people; and more specifically to a hairbrush that releases active ingredients during brushing, which include fragrance, therapeutic or moisturizing ingredients, antibacterial compounds, insect repellant, hair-conditioning products, dye compositions or other hair-related products.

2. Description of the Prior Art

Many patents address issues related to hairbrush designs that incorporate a number of bristles for providing desired brushing action. Brushes for pets typically incorporate harsh bristles, while those for humans are typically provided with softer bristles. Several patents disclose coating bristles with desired compositions in order to deliver these compositions to the brushed hair.

U.S. Pat. No. 4,244,076 to Meyer discloses a method and forming tool for the fabrication of a bristle support for a brush, especially a hairbrush. This method is for attaching pin-like bristles to a bristle support or carrier for a hairbrush. In a first step the rows of bristle pins are interconnected with one another at their rear end by means of a web. The individual bristle pin rows are retained in their position by the web. In a next step the bristle pins, at the region of their rear end, together with the webs, are cast in the material of the bristle support, so that the bristle pin rows are embedded in the bristle support. In this method, the bristle pins are molded into a cast support that is rigid and solid and therefore is incapable of delivering perfume or other active compositions to the hair being brushed.

U.S. Pat. No. 5,150,491 to Ikemoto discloses a hairbrush. A hairbrush is adapted to prevent static charging of the bristles and hair. It has a multiplicity of small holes formed in a conductive brush base that carries a row of antistatic members. The antistatic members are made stiff and are prevented from bending down, rendering the brush easy to draw through hair for smooth brushing. The conductive brush base is solid and cannot deliver perfume or other active compositions to hair, but merely eliminates the static present in the hair and bristles by conducting charges that are present.

U.S. Pat. No. 5,261,426 to Kellett, et al. discloses a hydrophilic foam pad for hair styling. The hair conditioning and styling pad is a shaped body of a resilient, open-celled, hydrophilic polyurethane foam matrix integrally incorporating an aqueous phase incorporating about 70-90% water, about 5-25% of a hair conditioning agent, and a nonionic surfactant. The bristles or tines of a brush contact the resilient pad and transfer the aqueous hair styling composition to the brush so that the composition is subsequently transferred to the hair as it is being styled. This styling device requires periodic contact with the resilient pad to recharge the bristles, and does not by itself deliver perfume or other active compositions to hair.

U.S. Pat. No. 5,626,099 to Staller, et al. discloses a therapeutic groomer. This hand-held grooming device grooms, massages, and provides magnetic therapy for animals. The device has a base that is configured to be handheld. On the base, there is formed a grooming pad having projections adapted for grooming and massaging. The grooming pads are formed by either a plurality of parallely arranged strips each having magnetic properties or a single magnetic sheet. Each strip has its magnetic poles aligned uniformly so that its longitudinal ends are polar opposites. This therapeutic groomer does not deliver perfume or active compositions to the hair being groomed.

U.S. Pat. Nos. 6,450,127 and 6,543,388 to Willinger, et al. disclose an ergonomic handle for a grooming brush. This brush handle is formed with a continuously arched upper surface portion and a lower surface portion separated by a humped semicircular ridge. One of the lower arched portions forms a trigger grip for a single finger held in either a forehand or backhand grip. The handle is covered with a high friction material in the form of a contoured rubber or elastomeric sleeve, which is stretched over a molded plastic handle. These patents relate only to the shape of a handle of a hairbrush and do not disclose a hairbrush that delivers perfumes or other active ingredients to brushed hair.

A hairbrush commercially marketed by JW Pet Company (Hasbrouck Heights, N.J.) incorporates an ergonomic handle disclosed in U.S. Pat. Nos. 6,450,127 and 6,543,388. It uses a polymeric molded closed elliptical cavity which includes a thick elliptical rubber element carrying multitudes of metallic bristle pins with rounded tips. The distal end of the bristle pins opposed to the rounded tips carries a nail heads, which rests against and is glued to a thick rubber element using rubber cement or similar glue. The bristle pins in the rubber element form an air leak tight seal. The elliptical rubber element has a single hole appointed for discharging air. This elliptical rubber element with attached pins is squeezed into the closed elliptical cavity of a polymeric molded brush and the rubber element adopts a concave shape with the pins sticking out in a non-planar configuration. During use, pressure is applied to the pins in the middle portion of the elliptical rubber element of the brush. The air entrapped in the cavity formed by the rubber element and elliptical cavity is squeezed by the pressure applied thereby providing a springy feel, while the entrapped air is released through the single hole present in the elliptical rubber element. This brush has a single air outlet and discharges air entrapped in the elliptical cavity of the brush. It has no means available for delivering a perfume or other active ingredients to the brushed hair.

U.S. Pat. No. 6,575,174 to Lee discloses a hair grooming brush. This hair grooming brush has a plurality of rows of curved wavy bristles, rather than traditional straight bristles commonly found on brushes and combs. The curvature of the bristles produces a springiness to the bristles when pressure is applied during the combing action. The springiness of the numerous rows of bristles translates into a massaging effect upon the hair and scalp. These springy bristles do not deliver perfumes or other active compositions to the hair being brushed.

There remains a need in the art for an easy to use hairbrush for brushing human or pet hair that delivers one ore more active ingredients, such as perfume or other active compositions to the hair being brushed. Further, the hairbrush must release perfume or other active compositions on demand.

SUMMARY OF THE INVENTION

The present invention discloses a lightweight hairbrush with a brush base having an internal cavity with a bottom surface having a first opening and top surface having a second opening, respectively. The first cavity opening is located on the bottom surface of the brush base, facing the bristles of the brush. The second cavity opening is located on the top surface of the brush base, opposed to the bristles. An flexible, deformable membrane, preferably made from rubber, carries a multitude of bristles, and covers and tightly fits within the first opening of the internal cavity. The flexible, deformable membrane has a number of holes or apertures positioned between the bristles. The second cavity opening is slidably fitted with a back cover, arranged so that it can be manually pushed in and out. A squeezable and porous sponge is positioned within the internal cavity, wherein the sponge is resting in-between and defined within the flexible deformable membrane and the slidable cover, respectively. The porous sponge is saturated with a desired perfume or fragrance or other active compositions such as insect repellants, hair-conditioning products, dye compositions, moisturizing ingredients, antibacterial compounds, and the like. When hair is brushed with the brush of the subject invention, the flexible membrane is deformed, causing the sponge to be squeezed and the fragrance or perfume or other active composition is released to the hair being brushed through the apertures in the flexible deformable membrane.

Alternatively, the back cover which is positioned over the second opening may be manually pushed inwards towards the bristles, thereby squeezing the porous sponge and releasing the fragrance, or perfume and/or other active compositions through the apertures in the flexible deformable member. This method of releasing the fragrance and/or active compositions does not require the bristles to be in contact with the hair being brushed, and can therefore be used to treat selected areas of hair prior to vigorous brushing.

The bristles may be attached to the flexible deformable membrane by a number of methods. The bristles may be molded together with the deformable membrane, as a unitary body. In another embodiment, the bristles may be in the form of metallic pins with rounded ends that contact hair and may have a nail-like structure on the opposite end of the pin. In this embodiment, the pins are inserted through the flexible membrane through previously made holes with the rounded end penetrating the membrane, and each pin being inserted sufficiently to contact the nail head against the flexible deformable membrane. The nail heads of the metallic pins may be further held in place by the application of glue cement.

The brush is assembled first by inserting the flexible, deformable membrane with brush elements attached thereto into the first opening of the internal cavity of the brush base. The deformable membrane is entirely contained within the first opening, wherein the perimeter of the membrane rests against the inner wall which is defined by the internal cavity. Next, the porous sponge that is saturated with the perfume or active compositions is inserted through the second opening and rests against the flexible deformable membrane. The back cover is now inserted over the second opening and rests against the porous sponge. When the sponge is exhausted, it is replaced by removing the back cover, removing the old sponge, and inserting a new porous sponge.

The porous sponge that is saturated with perfume and/or other active compositions including insect repellant, hair-conditioning products, dye compositions, moisturizing ingredients, antibacterial compounds, and the like is marketed as a replacement product. The porous sponge is sealed in a polymeric wrapper, and the user opens the sponge and inserts it into the internal cavity of the hairbrush of the subject invention. Under normal use a fresh porous sponge lasts over 15 days.

The bristles display a springy action first due to the flexible deformable membrane, which traps air within the internal cavity. The porous sponge also acts as a resilient member providing a cushioning action. Pushing the back cover in to release the fragrance, perfume and/or other active composition is resisted by the flexible deformable membrane, wherein the porous sponge behaves like a spring and returns the cover to the original position after release of the fragrance perfume and/or other active composition.

Significant advantages are realized by practice of the present invention. The key features of the pneumatic pet/people brush, include, in combination, the features set forth below:

1) a brush base with an internal cavity with a bottom surface having a first opening and top surface having a second opening, respectively;

2) the first opening appointed to receive a flexible deformable membrane;

3) the second opening appointed to receive a back cover;

3) the flexible deformable membrane having several rows of bristle elements and a plurality of apertures;

4) a porous sponge being saturated with perfume, fragrance and/or other active compositions including insect repellants, hair-conditioning products, dye compositions, moisturizing ingredients, antibacterial compounds, and the like, being placed between the flexible deformable membrane and the back cover, respectively, within the internal cavity;

5) wherein the brushing action deforms the flexible deformable membrane, thereby squeezing the porous sponge and releasing the perfume, fragrance and/or other active compositions saturated within the porous sponge through the apertures in the flexible deformable membrane;

6) wherein the user at any time may manually depress the back cover to squeeze the porous sponge causing it to release the fragrance, perfume and/or other active compositions saturated within the porous sponge through the apertures in the flexible deformable membrane; and 7) wherein the user may periodically replace the sponge with a fresh sponge when the fragrance, perfume and/or other active composition is exhausted;

whereby the user of the hairbrush of the subject invention is provided with the capability to saturate the hair being brushed with a perfume, fragrance and/or other active compositions including insect repellant, hair conditioning products, dye compositions, moisturizing ingredients, antibacterial compounds, and the like.

BRIEF DESCRIPTION OF THE DRAWING

The invention will be more fully understood and further advantages will become apparent when reference is had to the following detailed description of the preferred embodiments of the invention and the accompanying drawings, in which.

DETAILED DESCRIPTION OF THE INVENTION

Figure 1:
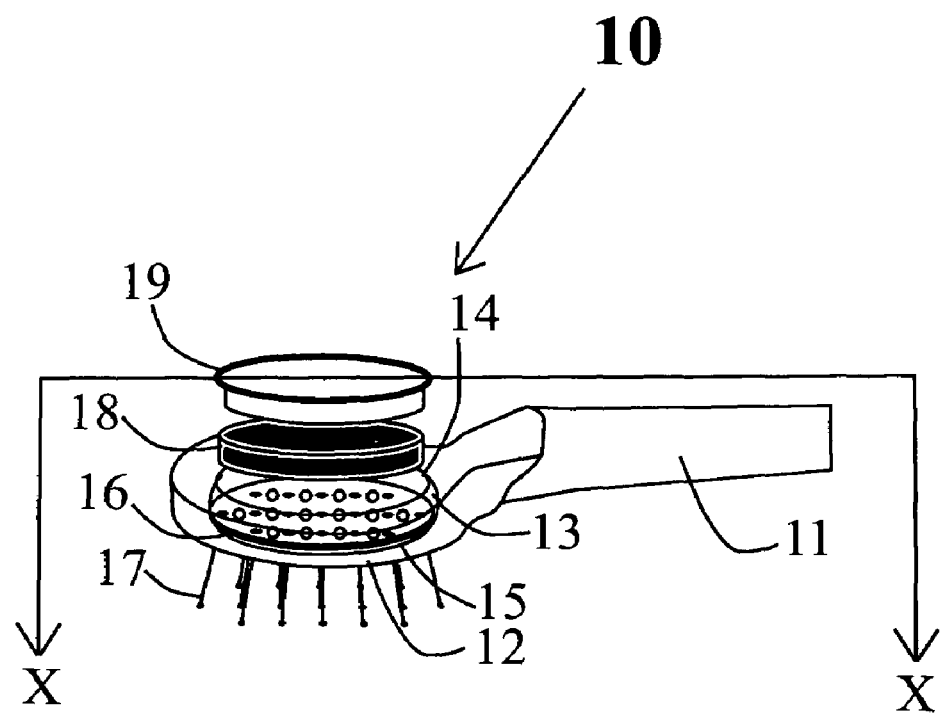
FIG. 1 is an illustration of the hairbrush of the subject invention showing the brush base, the internal cavity; the flexible deformable membrane with brush elements, the porous sponge saturated with perfume, fragrance and/or other active compositions, and the back cover.

This invention relates to a hairbrush for use with pets and humans. The hairbrush of the subject invention releases a fragrance, perfume and/or other active compositions including insect repellent compositions, hair conditioning and grooming products or dye compositions, moisturizing ingredients, antibacterial compounds, or the like.

The hairbrush is provided with a brush base that has an internal cavity with a bottom surface having a first opening and top surface having a second opening, respectively. The first opening receives a flexible deformable membrane which carries the bristle elements and has several apertures designed to release a fragrance, perfume and/or active compositions during brushing or at the desire of the user at any time. The first opening receives the flexible deformable membrane with the bristles extending from the brush base, wherein the perimeter of the flexible deformable membrane rests against the interior wall defined by the internal cavity, thereby forming a leak tight seal. A porous sponge saturated with the fragrance, perfume and/or other active compositions is placed within the internal cavity and resting on the flexible deformable membrane. A back cover is inserted through the second opening and rests against the sponge and forms a leak tight seal for the internal cavity.

Generally stated, the invention consists of a hairbrush which releases fragrance, perfume and/or other active compositions during brushing or at any time by the user pressing the back cover. During the brushing action the bristles apply pressure against the central portion of the flexible deformable membrane flattening the membrane configuration. This flattening action directly applies pressure on the porous sponge which releases the fragrance, perfume and/or other active compositions saturated within it through the apertures in the flexible deformable membrane. Alternatively, the fragrance, perfume and/or other active compositions may be released at will by manually depressing the back cover which squeezes the porous sponge saturated with the fragrance, perfume and/or other active composition.

The first opening may take any shape including elliptical, circular, rectangular, or square-shaped. The second opening may take any shape including elliptical, circular, rectangular, or square-shaped. The flexible, deformable membrane may take any shape including elliptical, circular, rectangular, or square-shaped. The porous sponge may take any shape including elliptical, circular, rectangular, or square-shaped. The back cover may take any shape including elliptical, circular, rectangular, or square-shaped. Any other suitable geometric shapes are within the scope of the present invention. Preferably, each of the first opening, second opening, flexible membrane, sponge, and back cover has the same general shape, respectively. At a minimum, all that is required is that, whatever its shape, the flexible deformable membrane and the cover form an air tight seal with the internal cavity so that the perfume, fragrance and/or other active composition is released reliably.

The flexible deformable membrane is preferably made from rubber typically with a thickness of 1/32 inch to 3/32 inch. The bristles are preferably metallic pins with a rounded end contacting hair and a nail head provided on its other end. These pins are inserted through previously made apertures in the flexible deformable membrane pushing the rounded end through the aperture until the nail head contacts the rubber surface. A glue cement may be applied to attach the bristles permanently to the flexible deformable membrane.

The assembly of the hairbrush of the subject invention involves the steps comprising:
1. The flexible deformable membrane is inserted through the first opening in the internal cavity of the brush base. Since the flexible deformable membrane has a slightly larger dimension than the first opening in the brush base, it has to be flexed to insert the flexible deformable membrane. At this stage, the bristles incorporated in the flexible deformable membrane point away from the internal cavity of the brush base. The perimeter of the flexible deformable membrane rests against the interior walls defined by the internal cavity, thereby forming an airtight seal.
2. The porous sponge saturated with fragrance, perfume and/or other active composition is now inserted from the second opening in the internal cavity of the brush base. The porous sponge is arranged so that it rests on the flexible deformable membrane.
3. The back cover is inserted over the second opening. This is a sliding fit providing a leak tight seal. The back cover rests against the porous sponge.
4. Now the assembled brush is ready to use. It delivers a perfume, fragrance and/or other active compositions saturated within the sponge when the hairbrush is used to brush human or pet hair. Alternatively, the fragrance, perfume and/or other active composition may be released at will by manually depressing the slidable back cover. Once the perfume, fragrance and/or active composition is exhausted, typically in 15 days of use, the porous sponge is replaced with a fresh sponge by removing the back cover, discarding the used-up sponge, inserting a fresh sponge and re-inserting the back cover.

FIG. 1 illustrates at 10 the hairbrush of the subject invention with a handle 11 and showing the brush base 12 with an internal cavity 13. The internal cavity 13 has a first opening generally marked 15 and a second opening generally marked 14. A flexible deformable membrane 16 with bristle elements 17 is inserted within the first elliptical opening 15. A porous sponge 18 saturated with perfume, fragrance and/or other active composition is inserted above the flexible deformable membrane 16 within the internal cavity 13. The second opening 14 receives a back cover 19, which rests against the porous sponge 18.

Figure 2:
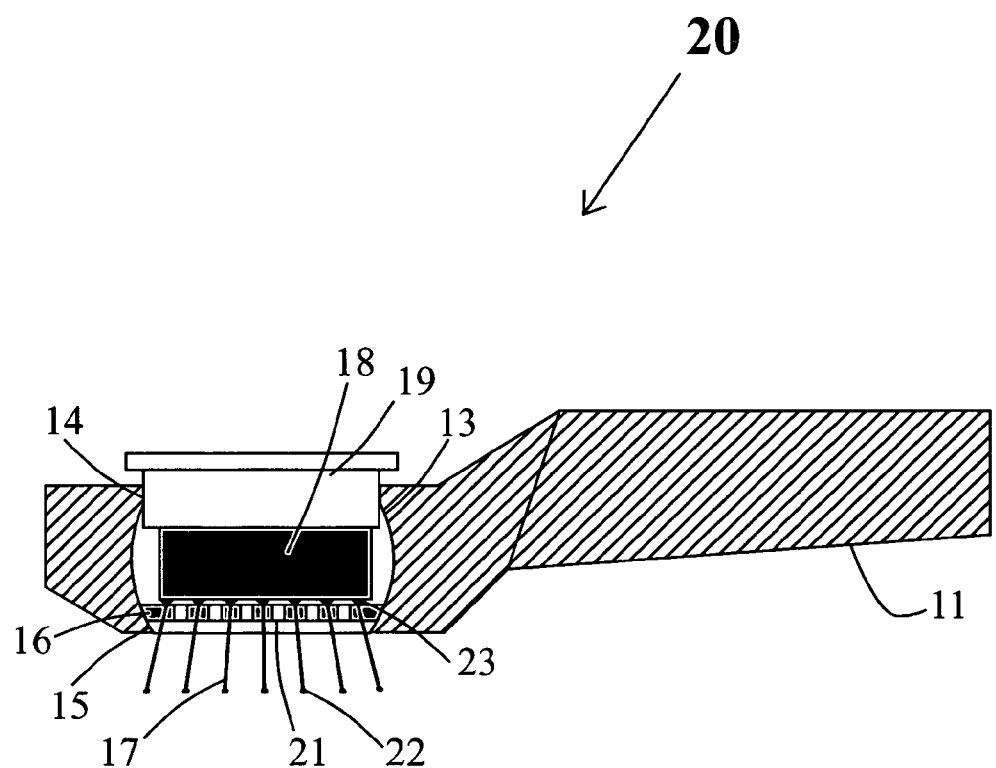
FIG. 2 is a cross section of the assembled hairbrush of the subject invention along cross section XX of FIG. 1 showing the relative locations of the flexible deformable membrane, the porous sponge, and the back cover.

FIG. 2 illustrates at 20 a cross section of the assembled hairbrush of the subject invention along cross section XX of FIG. 1. In its assembled configuration, the flexible deformable membrane 16 is entirely contained within the first opening 15. The flexible deformable membrane 16 is located against the inner wall defined by the internal cavity 13 so as to form a leak tight seal. Due to the larger dimension of the flexible deformable membrane, it protrudes the first opening 15 with a convex bulge. The bristle elements 17 (or pins), which are metallic pins with a rounded end at 22, are inserted into the flexible deformable membrane 16. These pins have a nail head shaped end at 23 which rests against the flexible deformable membrane 16 and may further be permanently bonded to the flexible deformable membrane by glue cement. The pins 17 with rounded ends 22 protrude to create a non-planar bristle tip, as shown. When this brush is used, the bristle elements 17 being located at the center of the flexible deformable membrane 16 contact the hair of the person or pet first, thereby deforming the flexible deformable membrane 16. The porous sponge 18 saturated with perfume, fragrance and/or other active compositions is located in contact with the flexible deformable membrane 16. On the top side of the porous sponge there is the back cover 19, which is inserted through the second opening 14 forming a leak tight seal of the internal cavity. When the hairbrush is used, pressure is applied to the flexible deformable membrane 16 which in turn squeezes the porous sponge 18, thereby releasing the perfume, fragrance and/or other active composition incorporated in the sponge. The release occurs through a plurality of apertures 21 in the flexible deformable membrane 16. Alternatively, the fragrance, perfume and/or other active composition may be released at any time by the user manually depressing the back cover 19, even when the hairbrush is not brushing hair.

Having thus described the invention in rather full detail, it will be understood that such detail need not be strictly adhered to, but that additional changes and modifications may suggest themselves to one skilled in the art, all falling within the scope of the invention as defined by the subjoined claims.

What is claimed is:

1. A hairbrush for humans and pets comprising:
   a. a molded brush base with a handle and an internal cavity with a bottom surface having a first opening and top surface having a second opening, respectively;
   b. a flexible, deformable, one-piece membrane disposed within said first opening, said flexible, deformable, one-piece membrane having bristles of a brush fixedly attached thereto and having a plurality of apertures located in-between said bristles;
   c. a porous sponge having a top surface and a bottom surface, said porous sponge being saturated with perfume, fragrance and/or other active compositions including insect repellant, hair conditioning compositions, dye compositions, moisturizing ingredients, or antibacterial compounds, being placed over said flexible deformable membrane within said internal cavity;
   d. a cover having a top surface and a bottom surface said cover being slidably fit within said second opening and wherein said bottom surface of said cover is pressing against substantially the entire surface area of said top surface of said porous sponge;
   whereby brushing hair with said hairbrush deforms said flexible, deformable, one-piece membrane and squeezes said sponge releasing said perfume, fragrance and/or other active compositions saturated within said porous sponge through said apertures in said flexible, deformable, one-piece membrane, and
   whereby pressing the cover squeezes said porous sponge releasing said perfume, fragrance and/or other active compositions saturated within said porous sponge through said apertures in said flexible, deformable, one-piece membrane even when said bristles of said brush are not in contact with hair.

2. The hairbrush as recited by claim 1, wherein each of said first and second openings, respectively, are elliptical, and said flexible, deformable, one-piece membrane is elliptical, and said cover is elliptical.

3. The hairbrush as recited by claim 1, wherein each of said first and second openings, respectively, are circular, and said flexible, deformable, one-piece membrane is circular, and said cover is circular.

4. The hairbrush as recited by claim 1, wherein each of said first and second openings, respectively, are rectangular, and said flexible, deformable, one-piece membrane is rectangular, and said cover is rectangular.

5. The hairbrush as recited by claim 1, wherein each of said first and second openings, respectively, are square-shaped, and said flexible, deformable, one-piece membrane is square-shaped, and said cover is square-shaped.

6. The hairbrush as recited by claim 1, wherein said flexible, deformable, one-piece membrane is made from rubber having a thickness in the range of $1/32$ inch to $3/32$ inch.

7. The hairbrush as recited by claim 1, wherein said bristles are metallic and have a first rounded end and a second nail head end, respectively, and wherein said flexible, deformable, one-piece membrane is permanently attached to said metallic bristles by inserting said rounded end and pushing said bristle until said nail head contacts said flexible, deformable, one-piece membrane, and thereby creating a permanent attachment of said bristles by glue cement.

8. A method for creating a hairbrush for humans and pets that releases a perfume, fragrance and/or other active compositions including insect repellant, hair conditioning composition, dye composition, moisturizing ingredients, or antibacterial compounds comprising the steps of:
   a. creating a brush base with an internal cavity with a bottom surface having a first opening and top surface having a second opening, respectively;
   b. producing a flexible, deformable, one-piece membrane with bristles rigidly attached thereto and having a plurality of apertures;
   c. inserting said flexible, deformable, one-piece membrane into said first opening in said internal cavity;
   d. inserting a porous sponge having a top surface and a bottom surface and being saturated with perfume, fragrance and/or other active composition through said second opening in said internal cavity, wherein said porous sponge is in contact with said flexible, deformable, one-piece membrane;
   e. slidably inserting a cover having a top surface and a bottom surface through said second opening in said internal cavity, wherein said bottom surface of said cover is in contact with substantially the entire surface area of said top surface of said porous sponge;
   whereby said flexible, deformable, one-piece membrane and slidable cover create a leak tight seal of said internal cavity in said brush base; and
   whereby brushing hair or manually depressing said cover releases said perfume, fragrance and/or active composition to hair.

* * * * *